(12) United States Patent
Qiao et al.

(10) Patent No.: US 9,310,053 B2
(45) Date of Patent: Apr. 12, 2016

(54) LIGHT MIXING ELEMENT, LIGHT GUIDE PLATE, BACKLIGHT MODULE AND DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventors: Zhonglian Qiao, Beijing (CN); Dongsheng Yang, Beijing (CN); Fei Liu, Beijing (CN); Weixin Zheng, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 151 days.

(21) Appl. No.: 14/064,402

(22) Filed: Oct. 28, 2013

(65) Prior Publication Data

US 2014/0119051 A1 May 1, 2014

(30) Foreign Application Priority Data

Oct. 29, 2012 (CN) .......................... 2012 1 0422434

(51) Int. Cl.
*F21V 7/04* (2006.01)
*F21V 13/04* (2006.01)
*F21V 8/00* (2006.01)

(52) U.S. Cl.
CPC .............. *F21V 13/04* (2013.01); *G02B 6/0028* (2013.01); *G02B 6/0078* (2013.01)

(58) Field of Classification Search
CPC .. G02B 6/0028; G02B 6/0079; G02B 6/0078; G02B 6/0075; F21V 13/04; F21V 13/12; F21V 13/02

USPC ............ 362/97.1, 97.2, 97.3, 97.4, 616, 622, 362/606, 607, 609, 327
See application file for complete search history.

(56) References Cited

U.S. PATENT DOCUMENTS

| 7,764,334 B2 * | 7/2010 | Kitagawa | ............. G02B 6/0068 349/65 |
| 8,491,143 B2 * | 7/2013 | Kuromizu | .................... 362/97.1 |

(Continued)

FOREIGN PATENT DOCUMENTS

| CN | 101071226 A | 11/2007 |
| CN | 102590927 A | 7/2012 |

OTHER PUBLICATIONS

Extended European Search Report issued Mar. 1, 2014; EP 13 19 0492.

(Continued)

*Primary Examiner* — Bao Q Truong
*Assistant Examiner* — Glenn Zimmerman
(74) *Attorney, Agent, or Firm* — Ladas & Parry LLP (57) ABSTRACT

A light mixing element in a shape of a prism, and a cylinder of the prism of the light mixing element includes a first light-emitting inclined surface, a second light-emitting inclined surface, a bottom surface, a incident surface and a reflecting inclined surface; one side of the second light-emitting inclined surface is connected with one side of the first light-emitting inclined surface to form a top angle; the bottom surface is arranged opposite to the top angle; the incident surface is connected between one side of the bottom surface and the other side of the first light-emitting inclined surface; and the reflecting inclined surface is connected between the other side of the bottom surface and the other side of the second light-emitting inclined surface and arranged opposite to the incident surface and the first light-emitting inclined surface.

12 Claims, 6 Drawing Sheets

(56) References Cited

U.S. PATENT DOCUMENTS

| | | | |
|---|---|---|---|
| 2009/0147537 A1* | 6/2009 | Iwasaki | G02B 6/0021 362/620 |
| 2009/0296373 A1 | 12/2009 | Chang | |
| 2010/0073903 A1* | 3/2010 | Yun et al. | 362/97.1 |
| 2010/0328943 A1* | 12/2010 | Takamura et al. | 362/235 |
| 2011/0255304 A1* | 10/2011 | Kinoshita | G02B 6/0038 362/607 |
| 2012/0008308 A1* | 1/2012 | Adachi | G02B 6/0021 362/97.2 |
| 2012/0014127 A1 | 1/2012 | Kanade et al. | |
| 2014/0036364 A1* | 2/2014 | Doric | 359/489.08 |

OTHER PUBLICATIONS

First Chinese Office Action dated Jul. 18, 2013; Appln. No. 201210422434.1.

Second Chinese Office Action dated Nov. 29, 2013; Appln. No. 201210422434.1.

Third Chinese Office Action dated Apr. 15, 2014; Appln. No. 201210422434.1.

Granted Claims CN 102927524, May 13, 2015.

Notification to Grant the Patent Right (Notice of Allowance); Issuing Date: Aug. 12, 2014; Appln. No. 201210422434.1.

* cited by examiner

LIGHT MIXING ELEMENT, LIGHT GUIDE PLATE, BACKLIGHT MODULE AND DISPLAY DEVICE

TECHNICAL FIELD

Embodiments of the present disclosure relate to a light mixing element, a light guide plate, a backlight module (BLM) and a display device.

BACKGROUND

Liquid crystal display (LCD) panels do not emit light spontaneously and hence usually achieve the display function via a backlight module in order for users to clearly see contents displayed by the LCD panels. The backlight module comprises light sources, an optical membrane, a reflector, a back plate and other necessary optical and structural components, and can be divided into an edge-lit type and a direct-lit type.

The light sources (such as light-emitting diode (LED)) of an edge-lit backlight are disposed aside a panel. Light emitted by the LED is directly incident into a light guide plate from one side and transmitted to the other end from this side of the light guide plate. The light is diffused to various directions when encountering diffusion points, and then emitted out through a light-emitting surface of the light guide plate. The main function of the light guide plate is to convert incident parallel light into planar light. Subsequently, the light emitted by the light guide plate is diffused and deflected by diffusion. Finally, the light converge within a same surface direction via two condensing prism sheets of which the surfaces take the shape of continuously jagged grooves, and the light divergence angle is adjusted.

In a direct-lit backlight structure, light sources are disposed under (or behind) an LCD panel. Light emitted by light sources on light bars is mixed during travel, diffused by a diffusion plate, and finally emitted out as a surface source.

With the development of the LED packaging technology, large-size LED LCD TVs (LCD TVs using LED for backlight) have entered the market and soon dominate the market. However, due to the limitations of brightness, efficiency and the like of LEDs, large-scale edge-lit backlights cannot meet the requirements of high brightness and high optical uniformity of a display device at present. Currently, all the LED LCD TVs with the large size of more than 55 inches adopt direct-lit backlight modules. The traditional direct-lit backlight modules mostly adopt small-size LEDs as light sources of the backlight modules, and the light-emitting surface of each LED is directly opposite to a diffusion plate. Due to the high concentration and strong light converging capability of the LEDs, spots of different brightness tend to be formed on the surface of the backlight module. In order to obtain a surface source with good uniformity, a plurality of LEDs are required to be arranged or the light mixing distance from the LED light-emitting surface to the diffusion plate is required to be increased, and hence the manufacturing cost of the backlight module is increased and the development of the backlight module towards low weight and thin profile is limited.

SUMMARY

Embodiments of the present disclosure provide a light mixing element, a light guide plate, a backlight module (BLM) and a display device so as to realize a large-size display device with high brightness and small thickness.

According to the first aspect of the present disclosure, a light mixing element which takes a shape of a prism is provided, a cylinder of the prism of the light mixing element comprises a light mixing element first light-emitting inclined surface, a light mixing element second light-emitting inclined surface, a bottom surface, a light mixing element incident surface and a reflecting inclined surface. One side of the light mixing element second light-emitting inclined surface is connected with one side of the light mixing element first light-emitting inclined surface to form a top angle; the bottom surface is arranged opposite to the top angle formed by the light mixing element first light-emitting inclined surface and the light mixing element second light-emitting inclined surface; the light mixing element incident surface is connected between one side of the bottom surface and the other side of the light mixing element first light-emitting inclined surface; and the reflecting inclined surface is connected between the other side of the bottom surface and the other side of the light mixing element second light-emitting inclined surface and arranged opposite to the light mixing element incident surface and the light mixing element first light-emitting inclined surface.

For instance, in the light mixing element, the light mixing element first light-emitting inclined surface and the light mixing element second light-emitting inclined surface are symmetrically arranged relative to a bisector of the top angle.

For instance, in the light mixing element, the bottom surface is perpendicular to the bisector of the top angle.

For instance, in the light mixing element, the light mixing element incident surface is perpendicular to the bottom surface.

For instance, in the light mixing element, two end surfaces of the prism of the light mixing element are reflecting surfaces of which the reflection directions are opposite to each other.

For instance, in the light mixing element, the bottom surface is provided with a reflecting surface facing the top angle.

For instance, in the light mixing element, microstructure is respectively disposed on the light mixing element first light-emitting inclined surface and the light mixing element second light-emitting inclined surface.

According to the second aspect of the present disclosure, a light guide plate is provided, and a cross section of the light guide plate is a trapezoid, of which an upper bottom is downwards; surfaces on which two sides of the trapezoid are disposed are respectively a light guide plate first incident inclined surface and a light guide plate second incident inclined surface provided respectively corresponding to the light mixing element first light-emitting inclined surface and the light mixing element second light-emitting inclined surface of any of the above-mentioned light mixing element.

For instance, the cross section of the light guide plate takes the shape of an isosceles trapezoid.

For instance, in the light guide plate, the sum of two base angles formed by the lower bottom and the two sides of the trapezoidal cross section of the light guide plate and the top angle formed by a light mixing element first light-emitting inclined surface and a light mixing element second light-emitting inclined surface of the light mixing element is 180 degrees.

According to the third aspect of the present disclosure, a BLM is provided, which comprises light sources, a plurality of light guide plates and a plurality of light mixing elements each disposed between every two adjacent light guide plates; the light guide plates each adopt any of the foregoing light guide plate; the light mixing elements each adopt any of the foregoing light mixing element; the light sources are arranged opposite to the light mixing element incident surfaces of the light mixing elements; in two adjacent light mixing elements, a light mixing element first light-emitting inclined surface of one light mixing element and a light mixing element second light-emitting inclined surface of the other light mixing element are respectively adhered to a light guide plate first incident inclined surface and a light guide plate second incident inclined surface of a light guide plate disposed between the two adjacent light mixing elements; and vertexes of top angles of the two light mixing elements abut against vertexes of two base angles of the light guide plate.

For instance, in the BLM, lower bottoms of trapezoidal cross sections of a plurality of the light guide plates are disposed in a same plane.

For instance, the BLM may further comprise a back plate on which the bottom surfaces of the light mixing elements and the light sources are fixed.

For instance, in the BLM, reflectors are disposed between the bottom surfaces of the light mixing elements and the back plate and configured to form reflecting surfaces on the bottom surfaces of the light mixing elements and facing the top angles of the light mixing elements.

For instance, in the BLM, a membrane assembly is also disposed on one side on which the lower bottoms of the trapezoidal cross sections of the plurality of the light guide plates are disposed.

For instance, in the BLM, cross sections of two light guide plates in the plurality of the light guide plates, disposed on the outmost side, are right trapezoids, of which right-angle sides are disposed on the outsides.

For instance, in the BLM, a reflecting layer is disposed on a right-angle side of the light guide plate, of which the cross section is a right trapezoid is disposed.

For instance, the BLM further comprises side panels adhered to the outsides of the two light guide plates of which the cross sections are right trapezoids; and the side panels are perpendicularly connected with the back plate.

For instance, in the BLM, bottom reflecting layers are disposed on the back plate, at positions corresponding to upper bottoms of the trapezoidal cross sections of the light guide plates.

According to the fourth aspect of the present disclosure, a display device is further provided, which comprises any of the above-mentioned BLM.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Embodiment 1

Figure 1A:
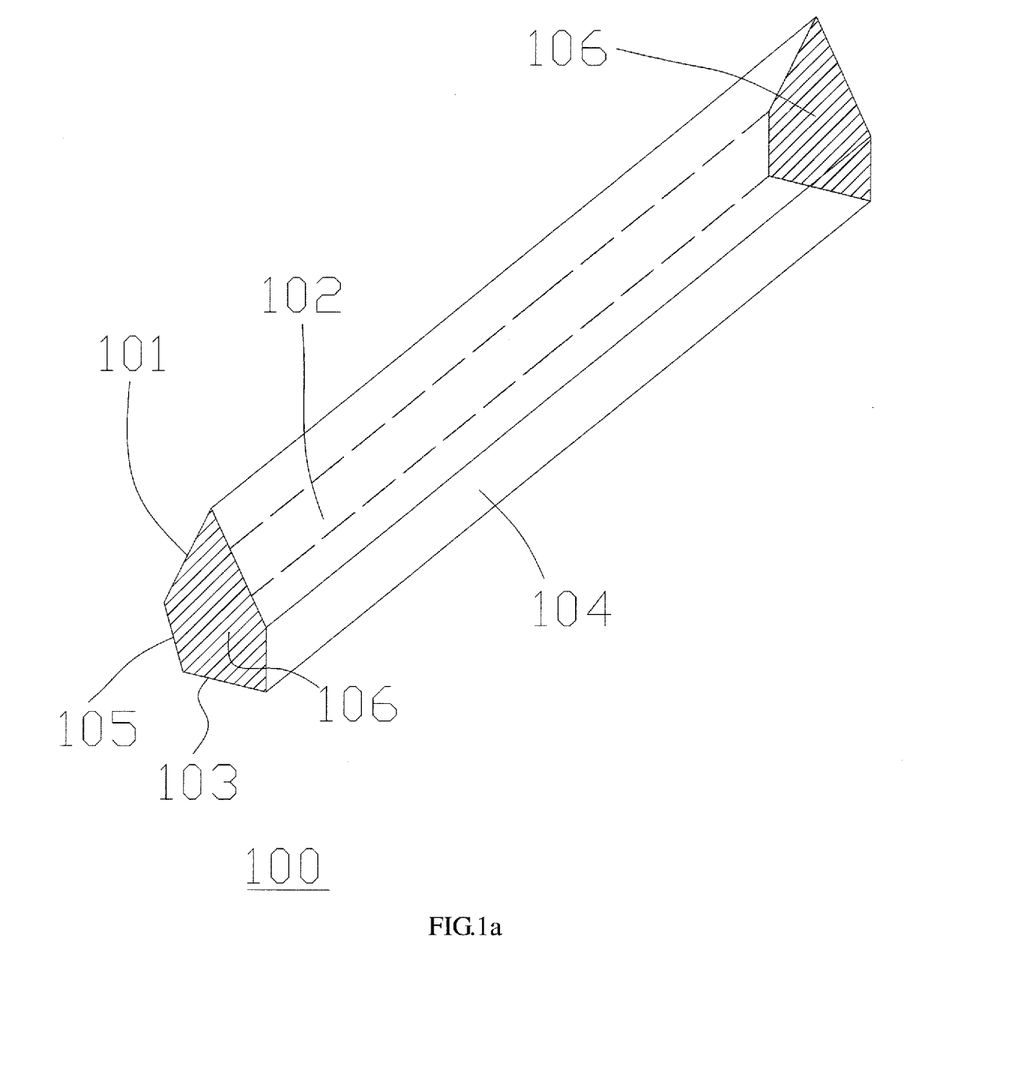
FIG. 1a is a schematic structural perspective view of a light mixing element according to an embodiment of the present disclosure.
Figure 1B:
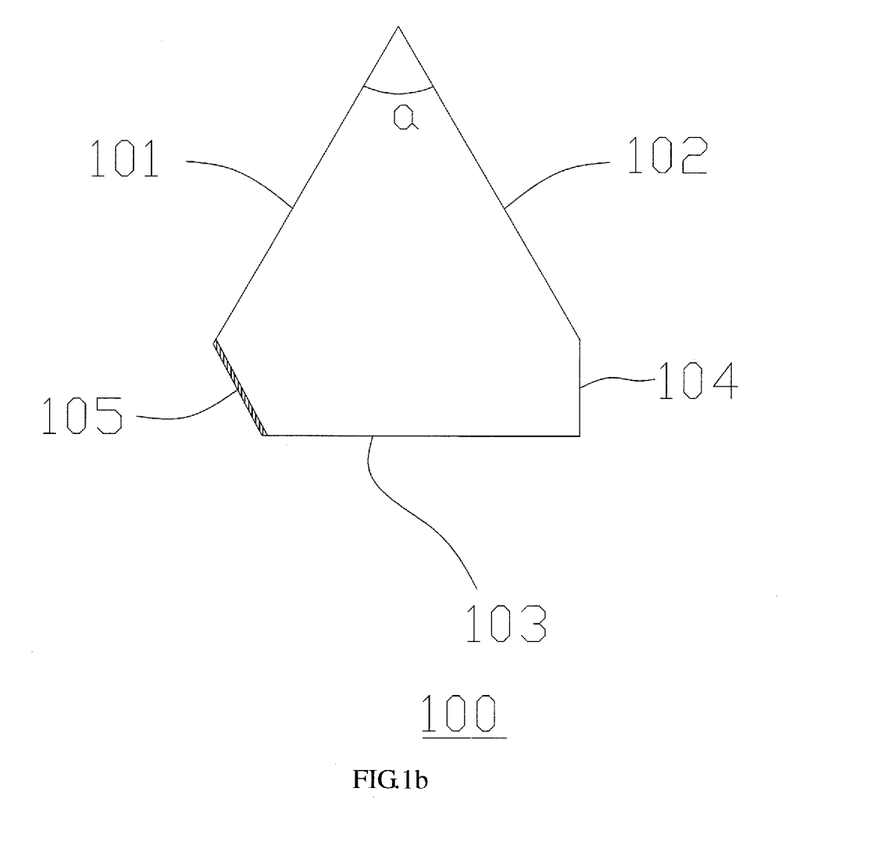
FIG. 1b is a schematic structural sectional view of the light mixing element according to an embodiment of the present disclosure.

As illustrated in FIGS. 1a and 1b, the embodiment provides a light mixing element 100, and the light mixing element 100 takes the shape of a prism; and a cylinder of the prism of the light mixing element 100 comprises a light mixing element first light-emitting inclined surface 101, a light mixing element second light-emitting inclined surface 102, a bottom surface 103, a light mixing element incident surface 104 and a reflecting inclined surface 105. One side of the light mixing element second light-emitting inclined surface 102 is connected with one side of the light mixing element first light-emitting inclined surface 101 to form a top angle "a"; the bottom surface 103 is arranged opposite to the top angle "a" formed between the light mixing element first light-emitting inclined surface 101 and the light mixing element second light-emitting inclined surface 102; the light mixing element incident surface 104 is connected between one side of the bottom surface 103 and the other side of the light mixing element second light-emitting inclined surface 102; and the reflecting inclined surface 105 is connected between the other side of the bottom surface 103 and the other side of the light mixing element first light-emitting inclined surface 101 and arranged opposite to the light mixing element incident surface 104 and the light mixing element second light-emitting inclined surface 102.

In the embodiment, a reflecting surface facing the top angle "a" may be formed on the bottom surface 103 and is configured to reflect and mix light incident onto the bottom surface 103. The reflecting surface may be formed by a reflective coating directly formed (for instance, coated) on the bottom surface 103, or a reflector or a reflective mirror adhered to the bottom surface 103.

Light incident from the light mixing element incident surface 104 is reflected and/or refracted and mixed in the light mixing element 100, and hence emitted out through the light mixing element first light-emitting inclined surface 101 and/or the light mixing element second light-emitting inclined surface 102.

An obtuse angle is formed between the reflecting inclined surface 105 and, for instance, the bottom surface 103, so that the reflecting inclined surface 105 is inclined to the left for a certain angle as shown in the drawing.

As illustrated in FIG. 1b, in the embodiment, the light mixing element first light-emitting inclined surface 101 and the light mixing element second light-emitting inclined surface 102 are symmetrically arranged relative to a bisector of the top angle "a". Of course, in another embodiment of the present disclosure, the light mixing element first light-emitting inclined surface 101 and the light mixing element second light-emitting inclined surface 102 may also be not symmetrically arranged relative to the bisector of the top angle "a" according to the design requirement.

In the embodiment, the bottom surface 103 is perpendicular to the bisector of the top angle "a".

In the embodiment, the light mixing element incident surface 104 is perpendicular to the bottom surface 103.

In the embodiment, two end surfaces 106 of the prism of the light mixing element 100 are reflecting surfaces of which the reflection directions are opposite to each other, that is, both the reflecting surfaces are arranged on inner side faces of the two end surfaces to reflect light inward. Moreover, the reflecting surfaces are configured to reflect and mix light incident onto the end surfaces 106.

Figure 2:
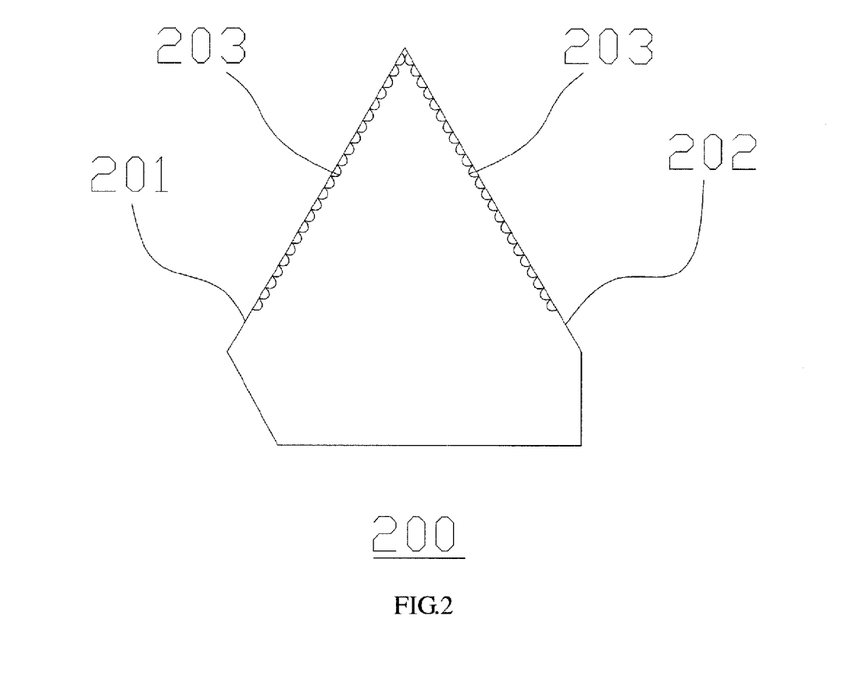
FIG. 2 is a schematic structural sectional view of another light mixing element according to an embodiment of the present disclosure.

As illustrated in FIG. 2, in a light mixing element 200 of another kind of structure according to an embodiment, microstructure may be further provided on a light mixing element first light-emitting inclined surface 201 and a light mixing element second light-emitting inclined surface 202 respectively. The microstructure 203 comprises a plurality of miniature recesses or protrusions, for instance, a plurality of closely distributed miniature recesses or protrusions or the like, so that more uniform light mixing in the light mixing element can be achieved, and hence more uniform light sources can be obtained through a light guide plate that cooperate with the light mixing element. Therefore, the microstructures only need to achieve more uniform light mixing in the light mixing element, and both the specific shape and the arrangement are not limited.

Embodiment 2

Figure 3A:
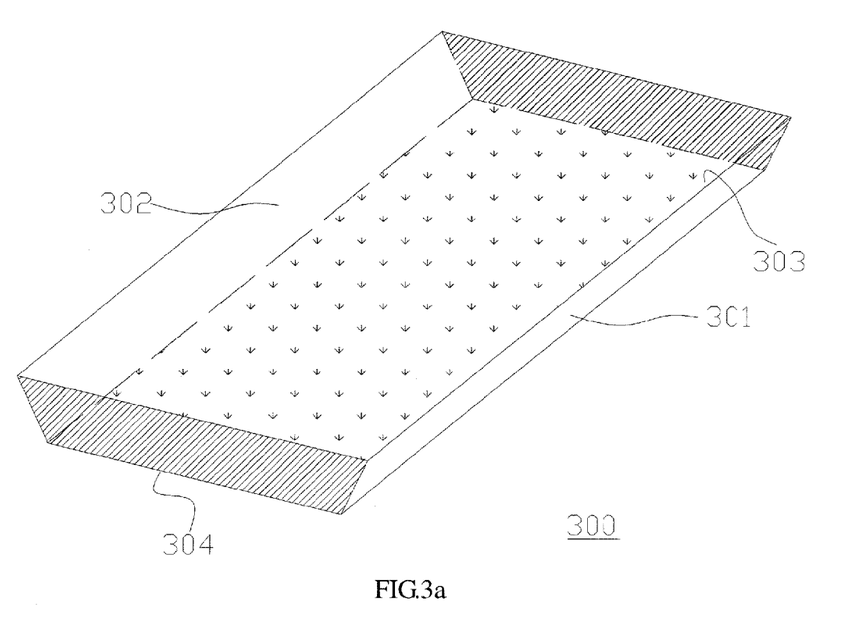
FIG. 3a is a schematic structural perspective view of a light guide plate according to an embodiment of the present disclosure.
Figure 3B:
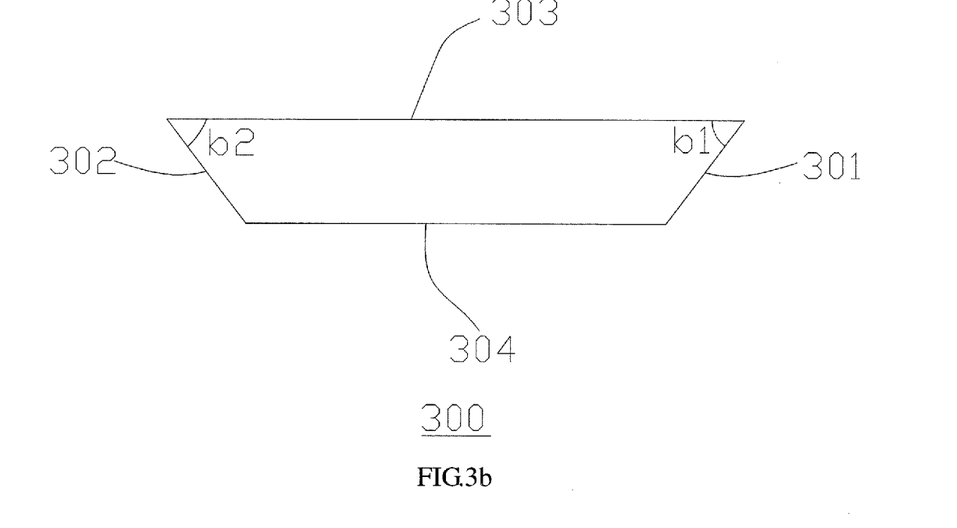
FIG. 3b is a schematic structural sectional view of the light guide plate according to an embodiment of the present disclosure.

As illustrated in FIGS. 3a and 3b, the embodiment provides a light guide plate 300, and the cross section of the light guide plate 300 takes the shape of a trapezoid of which the upper bottom is downwards; and surfaces on which two sides of the trapezoid are disposed may be respectively a light guide plate first incident inclined surface 301 and a light guide plate second incident inclined surface 302, which respectively correspond to the light mixing element first light-emitting inclined surface and the light mixing element second light-emitting inclined surface of the light mixing element as illustrated in the embodiment 1. In the embodiment, one side of the BLM, on which light-emitting surfaces are disposed, is taken as the upper part; lower bottoms 303 of the light guide plates 300 are taken as the light-emitting surfaces; and in practice, the light-emitting surfaces can be disposed upwards.

As illustrated in FIG. 3b, the cross section of the light guide plate 300 takes the shape of an isosceles trapezoid in the embodiment, corresponding to the symmetrical arrangement of the light mixing element first light-emitting inclined surface 101 and the light mixing element second light-emitting inclined surface 102 of the light mixing element 100 in the embodiment 1, relative to the bisector of the top angle.

In the embodiment, for instance, the sum of two base angles "b1" and "b2", formed by the lower bottom and two sides of the trapezoidal cross section of the light guide plate 300, and the top angle "a", formed by the light mixing element first light-emitting inclined surface 101 and the light mixing element second light-emitting inclined surface 102 of the light mixing element 100, is 180 degrees, so that the light-emitting surfaces of all the light guide plates 300 are in a same plane when the light guide plates are spliced together via the light mixing elements. Of course, in another embodiment, for instance, when a light-emitting surface of a display device is required to be not in a same plane in design (for instance, the light-emitting surface is required to be a cambered surface), the sum of the two base angles "b1" and "b2" formed by the lower bottom and the two sides of the trapezoidal cross section of the light guide plate 300 and the top angle "a" formed by the light mixing element first light-emitting inclined surface and the light mixing element second light-emitting inclined surface of the light mixing element 100 may be adjusted as required.

In the embodiment, an optical pattern may be further disposed on a surface 304 on which the upper bottom of the trapezoid of the light guide plate 300 is located, and is configured to transmit incident light and convert the light into a surface source, and alternatively, a reflecting surface may be provided to reflect the light back to the light guide plate.

After the light guide plates provided by the embodiment are spliced together with the light mixing elements to form a backlight module, the light emitted from the light mixing elements enters the light guide plates 300 through the light guide plate first incident inclined surfaces 301 and the light guide plate second incident inclined surfaces 302, converted into the surface sources by the light guide plates 300, and emitted out through the light-emitting surfaces 303 of the light guide plates 300.

Embodiment 3

Figure 4:
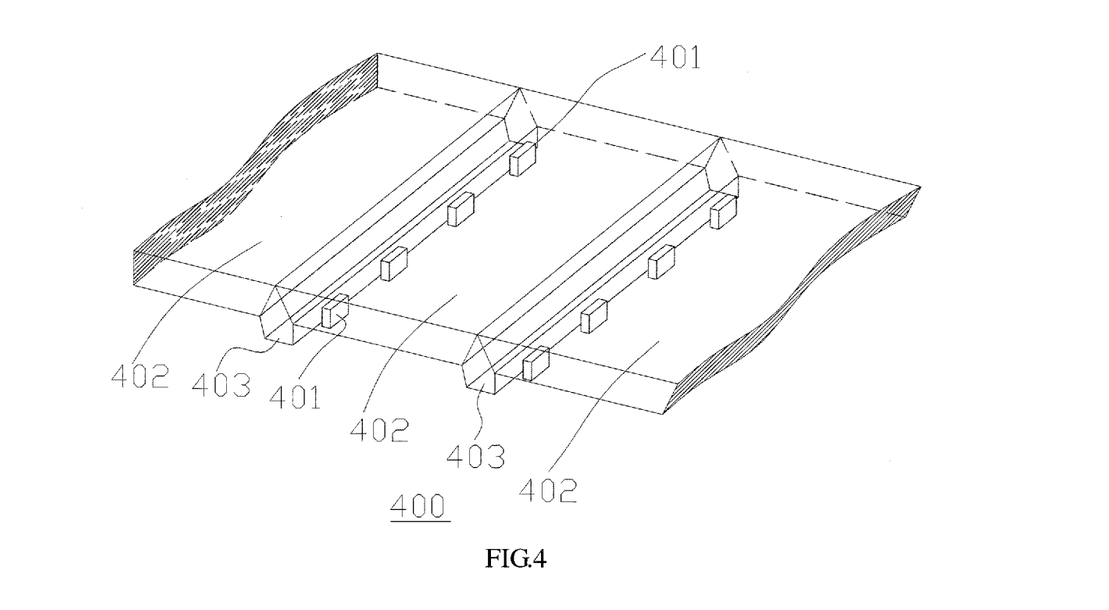
FIG. 4 is a schematic structural perspective view of a BLM according to an embodiment of the present disclosure.
Figure 5:
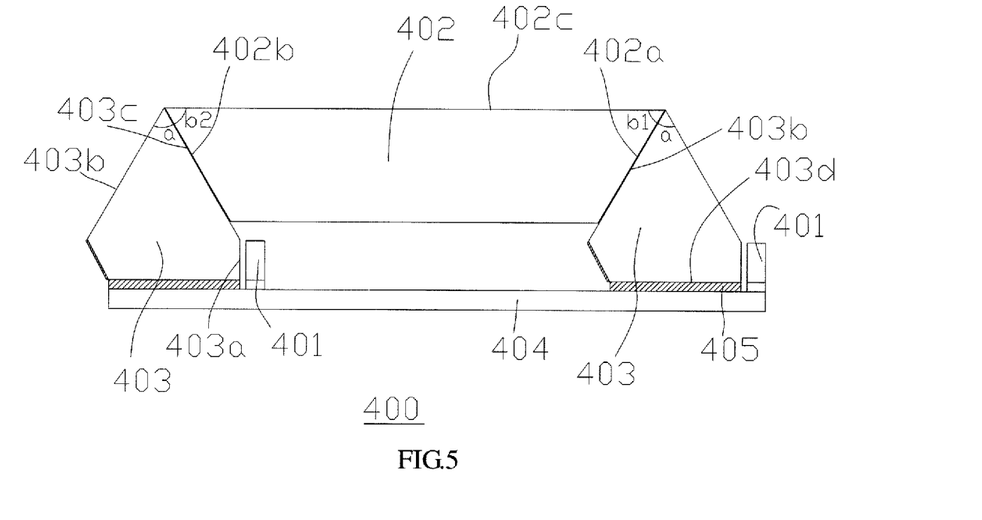
FIG. 5 is a schematic structural sectional view of the BLM according to an embodiment of the present disclosure.
Figure 6:
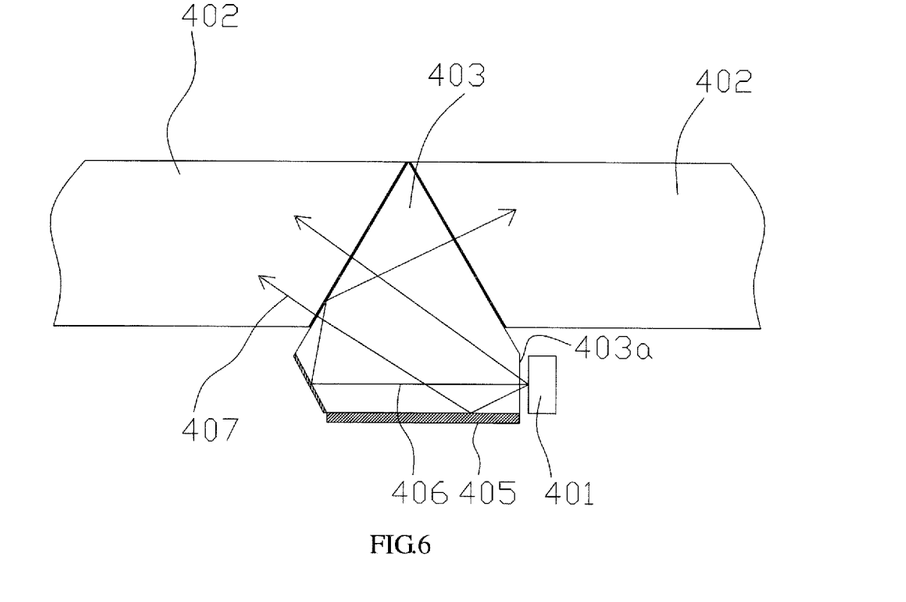
FIG. 6 is an optical path diagram illustrating the light transmission in the BLM according to an embodiment of the present disclosure.

As illustrated in FIGS. 4-6, the embodiment of the present disclosure provides a backlight module (BLM) 400, which comprises light sources 401, a plurality of light guide plates 402, and a plurality of light mixing elements 403 each disposed between every two adjacent light guide plates 402.

The light guide plates 402 adopt the light guide plates 300 as illustrated in the embodiment 2; the light mixing elements 403 adopt the light mixing elements as illustrated in the embodiment 1; and the light sources 401 are arranged opposite to light mixing element incident surfaces 403a of the light mixing elements 403.

As illustrated in FIG. 5, in two adjacent light mixing elements 403 of the embodiment, a light mixing element first light-emitting inclined surface 403b of one light mixing element 403 and a light mixing element second light-emitting inclined surface 403c of the other light mixing element 403 are respectively closely adhered to a light guide plate first incident inclined surface 402a and a light guide plate second incident inclined surface 402b of a light guide plate 402 disposed between the two adjacent light mixing elements 403, so that the light reflection caused by air gaps on interfaces can be avoided. Moreover, vertexes of top angles "a" of the two light mixing elements 403 abut against vertexes of two base angles "b1" and "b2" of the light guide plate 402 respectively, so that the top surfaces of the combined light guide plates are in one plane.

In the embodiment, the opposite light-emitting inclined surfaces of two adjacent light mixing elements 403 are respectively supported against two corresponding incident inclined surfaces of one light guide plate 402, and hence not only provide light channels for the light guide plate 402 but also have the function of structurally supporting the light guide plate 402. In the embodiment, LEDs are taken as the light sources 401. In other embodiments of the present disclosure, other appropriate light sources may also be adopted. Light-emitting surfaces of the LEDs are arranged directly opposite to the light mixing element incident surfaces 403a, so that light emitted by the LEDs is allowed to enter the light mixing elements 403.

In the embodiment, lower bottoms 402c of trapezoidal cross sections of a plurality of the light guide plates 402 are in a coplanar configuration, that is, disposed in a same plane.

As illustrated in FIG. 5, in the embodiment, the BLM 400 further comprises a back plate 404 on which the bottom surfaces of the light mixing elements 403 and the light sources 401 are fixed. In FIG. 5, the distance from the bottom surfaces of the light guide plates 402 to the back plate 404 is, for instance, greater than the height of the light mixing element incident surfaces 403a, and may also be equal to or less than the height of the light mixing element incident surfaces.

In the embodiment, reflectors or reflective mirrors 405 are disposed between the bottom surfaces 403d of the light mixing elements 403 and the back plate 404 and configured to form reflecting surfaces on the bottom surfaces 403d of the light mixing elements 403, facing the top angles "a."

As illustrated in an optical path diagram of FIG. 6, the light emitted by the LEDs is incident through the light mixing element incident surface 403a of the light mixing element 403, and is reflected, refracted, etc. (repeatedly) in the light mixing element 403 to form mixed light 406; the mixed light 406 enters the light guide plates through the incident inclined surfaces of the light guide plates 402 to form inner light 407 of the light guide plates 402; and parallel light is converted into planar light and emitted out after the light is fully reflected, diffused, etc. in the light guide plates 402.

Embodiment 4

Figure 7:
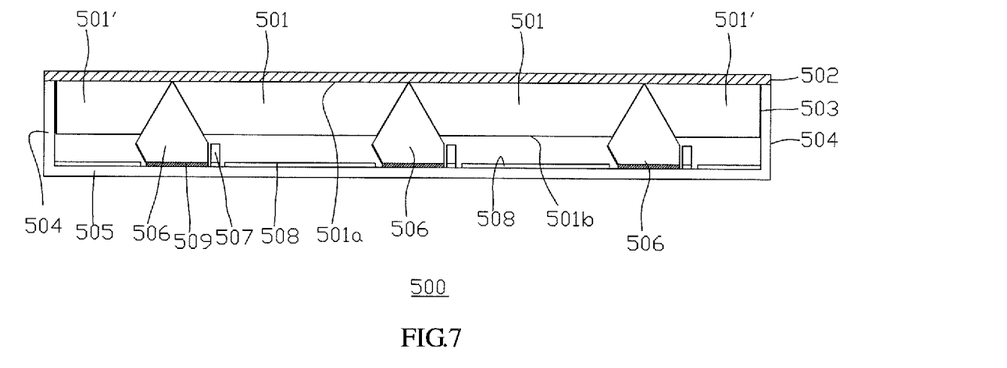
FIG. 7 is a schematic structural sectional view of another BLM according to an embodiment of the present disclosure.

As illustrated in FIG. 7, the embodiment provides a BLM 500. The basic structure of the BLM 500 is similar to that of the embodiment 3. The BLM 500 comprises light guide plates 501, light mixing elements 506, light sources 507, reflectors 509 and a back plate 505. The difference of the embodiment form the above lies in that: a membrane assembly 502 is also disposed on one side of a surface 501a on which lower bottoms of trapezoidal cross sections of a plurality of the light guide plates 501 are disposed. The membrane assembly 502 may include at least one optical film, for instance, a diffusion film, an antireflection film, a prism film.

In the embodiment, the cross sections of two light guide plates 501' of the plurality of light guide plates 501, disposed on the outmost side, are right trapezoids of which right-angle sides are disposed on the outsides.

In the embodiment, a reflecting layer 503 is disposed on one side, the right-angle side, of the light guide plate 501' of which the cross section is a right trapezoid, and configured to reflect light transmitted to the side faces of the light guide plates 501 back to interior of the light guide plates 501, so that the utilization rate of light sources can be improved.

In the embodiment, the BLM 500 may further comprise side panels 504 adhered to the outsides of the two light guide plates 501' of which the cross sections are right trapezoids; and the side panels 504 are perpendicularly connected with the back plate 505.

In the embodiment, bottom reflecting layers 508 are disposed on the back plate 505, at positions corresponding to surfaces 501b on which the upper bottoms of the trapezoidal cross sections of the light guide plates 501 are disposed, and configured to reflect light, which is leaked out to the bottom reflecting layers 508 from the light guide plates 501, back to the light guide plates 501, so that the utilization rate of light sources can be improved. At this point, it is not necessary to provide or form reflecting layers on the bottom surfaces of the light guide plates 501.

Embodiment 5

The embodiment provides a display device, which comprises a BLM and a display panel disposed on a light-emitting surface of the BLM.

In the embodiment, the BLM may adopt the BLM in the embodiment 3 or 4. Small-size light guide plates are spliced together along with light mixing elements to form a large-scale light guide plate.

The display device provided by the embodiment may be an LCD panel, an electronic paper, an LCD TV, an LCD monitor, a digital picture frame, a mobile phone, a tablet PC and any other product or component with display function.

In the embodiment of the present disclosure, narrow-strip small-size light guide plates are spliced together to form a large-scale light guide plate. With such a configuration, the phenomena of bending and deformation caused by uneven stress distribution can be easily avoided, and hence the yield and the optical properties of the light guide plates cannot be affected; and meanwhile, equipment for the injection molding of the large-scale light guide plates is not required. The light mixing element provided by the embodiment of the present disclosure can combine the characteristics of the traditional direct-lit backlight and the traditional edge-lit backlight, and not only solves the problem of low brightness of the large-scale edge-lit backlight but also achieves the aim of small thickness of the direct-lit backlight.

The embodiment of the disclosure being thus described, it will be obvious that the same may be varied in many ways. Such variations are not to be regarded as a departure from the spirit and scope of the disclosure, and all such modifications as would be obvious to those skilled in the art are intended to be included within the scope of the following claims.

What is claimed is:

1. A backlight module (BLM) of a display device, comprising: light sources, a plurality of light guide plates, and a plurality of light mixing elements, disposed between every two adjacent light guide plates, wherein
each light mixing element, in a shape of prism, a cylinder of the prism of the light mixing element including:
a light mixing element first light-emitting inclined surface;
a light mixing element second light-emitting inclined surface, of which one side is connected with one side of the light mixing element first light-emitting inclined surface to form a top angle;
a bottom surface arranged opposite to the top angle formed by the light mixing element first light-emitting inclined surface and the light mixing element second light-emitting inclined surface;

a light mixing element incident surface connected between one side of the bottom surface and the other side of the light mixing element first light-emitting inclined surface; and a reflecting inclined surface connected between the other side of the bottom surface and the other side of the light mixing element second light-emitting inclined surface and arranged opposite to the light mixing element incident surface and the light mixing element first light-emitting inclined surface;

the light sources are arranged opposite to the light mixing element incident surfaces of the light mixing elements;

a cross section of each light guide plate takes a shape of a trapezoid, of which the upper bottom is downwards; surfaces, on which two sides of the trapezoid are disposed, are respectively a light guide plate first incident inclined surface and a light guide plate second incident inclined surface provided respectively corresponding to the light mixing element first light-emitting inclined surface of one light mixing element and the light mixing element second light-emitting inclined surface of the other light mixing element;

in two adjacent light mixing elements, a light mixing element first light-emitting inclined surface of one light mixing element and a light mixing element second light-emitting inclined surface of the other light mixing element are respectively adhered to a light guide plate first incident inclined surface and a light guide plate second incident inclined surface of one light guide plate disposed between the two adjacent light mixing elements; and vertexes of top angles of the two light mixing elements abut against vertexes of two base angles of the light guide plate respectively.

2. The BLM according to claim 1, wherein lower bottoms of trapezoidal cross sections of a plurality of the light guide plates are disposed in a same surface.

3. The BLM according to claim 1, further comprising a back plate, on which the bottom surfaces of the light mixing elements and the light sources are fixed.

4. The BLM according to claim 1, wherein a membrane assembly is also disposed on one side of the surface on which lower bottoms of the trapezoidal cross sections of a plurality of the light guide plates are disposed.

5. The BLM according to claim 1, wherein cross sections of two light guide plates in the plurality of the light guide plates, disposed on the outmost side, are right trapezoids, of which right-angle sides are disposed on the outsides.

6. The BLM according to claim 3, wherein bottom reflecting layers are disposed on the back plate, at positions corresponding to upper bottoms of the trapezoidal cross sections of the light guide plates.

7. A display device comprising the BLM according to claim 1.

8. The BLM according to claim 1, wherein the cross section of the light guide plate takes the shape of an isosceles trapezoid.

9. The BLM according to claim 1, wherein the sum of two base angles formed by the lower bottom and the two sides of the trapezoidal cross section of the light guide plate and the top angle of the light mixing element is 180 degrees.

10. The BLM according to claim 3, wherein reflectors are disposed between the bottom surfaces of the light mixing elements and the back plate and configured to form reflecting surfaces on the bottom surfaces of the light mixing elements and facing the top angles of the light mixing elements.

11. The BLM according to claim 5, wherein a reflecting layer is disposed on a right-angle side of the light guide plate, of which the cross section is a right trapezoid.

12. The BLM according to claim 11, further comprising side panels adhered to the outsides of the two light guide plates of which the cross sections are right trapezoids; and the side panels are perpendicularly connected with the back plate.

* * * * *